United States Patent [19]

Matsuzaki et al.

[11] Patent Number: 5,555,148

[45] Date of Patent: Sep. 10, 1996

[54] OVERVOLTAGE PROTECTION DEVICE FOR CAPACITOR EXTERNALLY CONNECTED TO POWER IC

[75] Inventors: Hideaki Matsuzaki; Hiroshi Osawa; Yoshihide Gunji, all of Kohnan-machi, Japan

[73] Assignee: Zexel Co., Ltd., Tokyo, Japan

[21] Appl. No.: 357,178

[22] Filed: Dec. 13, 1994

[30] Foreign Application Priority Data

Dec. 21, 1993 [JP] Japan .................. 5-344703

[51] Int. Cl.⁶ .................. H02H 7/16
[52] U.S. Cl. .................. 361/15; 361/91
[58] Field of Search .................. 361/15, 16, 17, 361/91, 18

[56] References Cited

U.S. PATENT DOCUMENTS 4,012,667  3/1977  Ishida et al. .................. 361/15

Primary Examiner—Jeffrey A. Gaffin
Assistant Examiner—Sally C. Medley
Attorney, Agent, or Firm—Wenderoth, Lind & Ponack

[57] ABSTRACT

When a charging voltage Vs of a charging capacitor C is judged to exceed a voltage Vth1 through a comparator 8 of a charging voltage monitoring circuit 2, a logical output of the comparator 8 becomes "High" so that a control circuit 3 permits a transistor 4 of a discharging circuit 1 to be conductive, whereby the capacitor C discharges. Through such discharging, the charging voltage Vs decreases. When the voltage Vs is then judged to be less than a voltage Vth2, the logical output of the comparator 8 becomes "Low" so that the control circuit 3 stops the operation of the discharging circuit 1, whereby a power IC 18 permits the capacitor C to charge again. The charging and the discharging operation of the capacitor C are repeatedly conducted in this manner that.

4 Claims, 5 Drawing Sheets

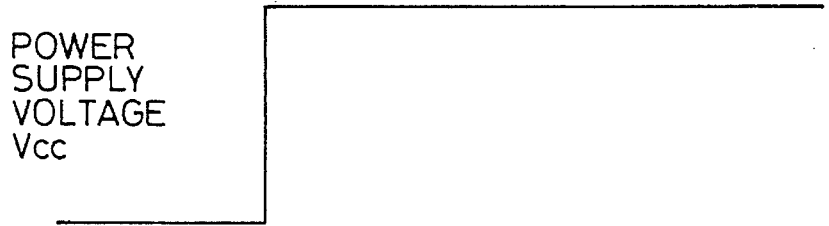
FIG. 3(a) POWER SUPPLY VOLTAGE Vcc
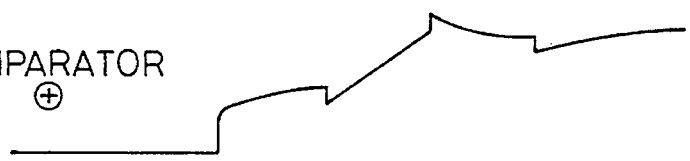
FIG. 3(b) COMPARATOR ⊕
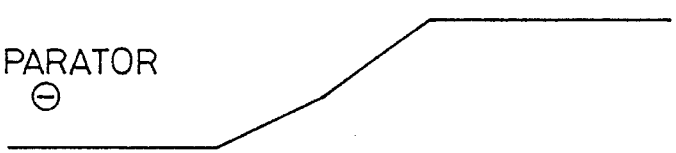
FIG. 3(c) COMPARATOR ⊖
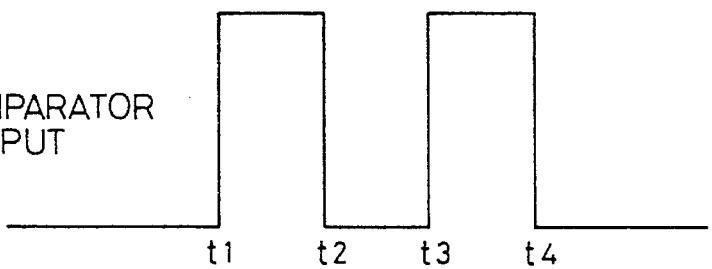
FIG. 3(d) COMPARATOR OUTPUT
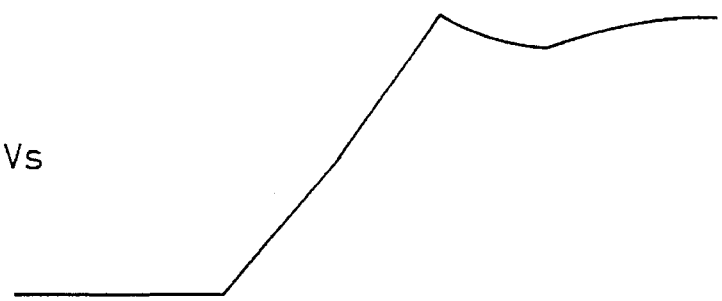
FIG. 3(e) Vs

OVERVOLTAGE PROTECTION DEVICE FOR CAPACITOR EXTERNALLY CONNECTED TO POWER IC

BACKGROUND OF THE INVENTION

1. Field of the Invention

The present invention relates to an overvoltage protection device, and more particularly to an overvoltage protection device for a capacitor connected to an output side of a power circuit of a power IC and like components.

2. Description of the Related Art

In recent years, various types of general-purpose power integrated circuits (ICs) have been developed and used in the power supplies of electric circuits.

For example, in a power supply for energizing a brushless motor of an automobile a power IC is employed for boosting voltages. Namely, as shown in FIG. 5, an output terminal of this type of a power IC 18, is connected with a charging capacitor C, so that a DC voltage Vcc applied to the power IC 18 is boosted to a voltage Vs (Vs=Vcc+A (volts)) through a booster circuit of the power IC 18, whereby the charging capacitor C charges up to the thus boosted voltage Vs.

For example, many power IC devices used in brushless motors are adapted to 12-volt systems in which a level of the voltage Vs is defined to be Vcc+10 (volts). Consequently, the case where level of the DC voltage Vcc supplied to the power IC is 24 volts (which is the maximum level in the 12-volt systems), the thus boosted voltage Vs reaches a level of 24+10 volts (i.e.. a level of 34 volts).

The dielectric strength of the power ICs adapted for use in the 12-volt systems of power supplies depends on the widths of the in print patterns of the power ICs themselves, the dielectric strength having a maximum level of 36 volts in practical situations. Consequently, as described above, even when the power IC is subjected to a maximum DC voltage of 24 volts instead of the normal 12 volts, the power IC may not suffer an electric breakdown since the boosted voltage Vs of the power IC is still under the maximum level of the dielectric strength of the power IC.

However, in some cases, there is the necessity of having the 24-volt system's power supply energize the above-mentioned brushless motor. In such cases, the power IC suffers from the problem of breakdown, because the boosted voltage Vs reaches 46 volts (i.e., Vs=36 volts+10 volts=46 volts), which completely exceeds the maximum level of the dielectric strength of the power IC, when the maximum level of 36 volts in the 24-volt system's power supply is applied to the power IC.

In one of possible solutions to the above problem, specifications of the power IC are changed so as to be well adapted to the 24-volt system. More specifically, the widths of the print pattern of the power IC may be enlarged so as to increase the maximum level of its dielectric strength. However, this substantially increases the cost of the power IC. On the other hand, the necessity of having the 24-volt system's power supply energize the above-mentioned brushless motor is rare in contrast with the necessity of having the 12-volt system's power supply energize the brushless motor. Further, even if the above-mentioned power IC is employed in the 24-volt system without changing its specifications, the power IC is rarely subjected to a voltage exceeding the maximum level of its rated voltage, except under abnormal conditions.

In an electric circuit shown in FIG. 5, as shown in the drawing, the simplest possible way for preventing the charging voltage of the charging capacitor C from exceeding a predetermined value is the provision of a Zener diode 20a in parallel with the charging capacitor C or the provision of a Zener diode 20b at a connection between a coil L and the power IC 18.

However, in actuality, when either of the Zener diodes 20a and 20b is used, an electric current applied to the Zener diode 20a or 20b is not restricted, which results in an electric breakdown of the Zener diode 20a or 20b due to overcurrent. Consequently, used of the Zener diode 20a or 20b is not adequate.

Further, additional related arts as to the charging and discharging operation of a capacitor are disclosed in Japanese Patent Laid-Open Nos. Hei 3-105068 and Hei 5-111241. More particularly, in the former (i.e., Japanese Patent Laid-Open No. Hei 3-105068), the occurrence of unitended electric sparks in the secondary side of an ignition coil connected with the output side of a DC-DC converter is prevented by not applying any voltage to the ignition coil when a thyristor in the DC-DC converter is abnormal in operation. On the other hand, in the latter (i.e., Japanese Patent Laid-Open No. Hei 5-111241), a DC-DC converter has an output voltage which is adjustable. Consequently, these related arts do not disclose a solution to the problem inherent in the power IC as described above.

SUMMARY OF THE INVENTION

It is an object of the present invention to provide an overvoltage protection device for a capacitor connected to an output terminal of a power IC and like components.

It is another object of the present invention to provide an overvoltage protection device which enables the power IC to use a which is larger than a rated voltage of the power IC without requiring any changes in the power IC's design configuration, and, which therefore permits the power IC to operate properly unless a voltage applied to the power IC exceeds the maximum level of the power IC's dielectric strength.

The above objects of the present invention are accomplished by providing:

An overvoltage protection device for a capacitor externally connected to a power IC, comprising:

a discharging means for discharging the capacitor;

a judgment means for judging whether a charging voltage of the capacitor exceeds a first reference voltage or reaches a second reference voltage; and an operation control means which operates the discharging means when the charging voltage is judged to exceed the first reference voltage, and stops the operation of the discharging means when the charging voltage reaches the second reference voltage.

In the present invention when the charging voltage of the capacitor reaches the first reference voltage, the judgment means issues a judgment signal to the control means which, according to the judgment signal, permits the discharging means to operate, so that the discharging means, in turn, permits the capacitor to discharge. As a result, when the charging voltage decreases and is judged by the judgment means to become lower than the second reference voltage, the control means stops the operation of the discharging means according to such judgment, which permits the capacitor to charge again.

Consequently, as for the power IC, it is possible to use a voltage which is larger than a rated voltage of the power IC by setting both the first and the second reference voltage between the maximum dielectric strength of the capacitor and a desired applying voltage which is less than the maximum dielectric strength, provided that such high voltage does not exceed the maximum dielectric strength of the power IC.

BRIEF DESCRIPTION OF THE DRAWINGS

FIGS. 3(a), 3(b), 3(c), 3(d) and 3(e) are schematic views of essential parts of individual waveforms appearing particularly in the beginning stage of a turning-on operation of a power switch (not shown);

DESCRIPTION OF THE PREFERRED EMBODIMENTS

Figure 1:
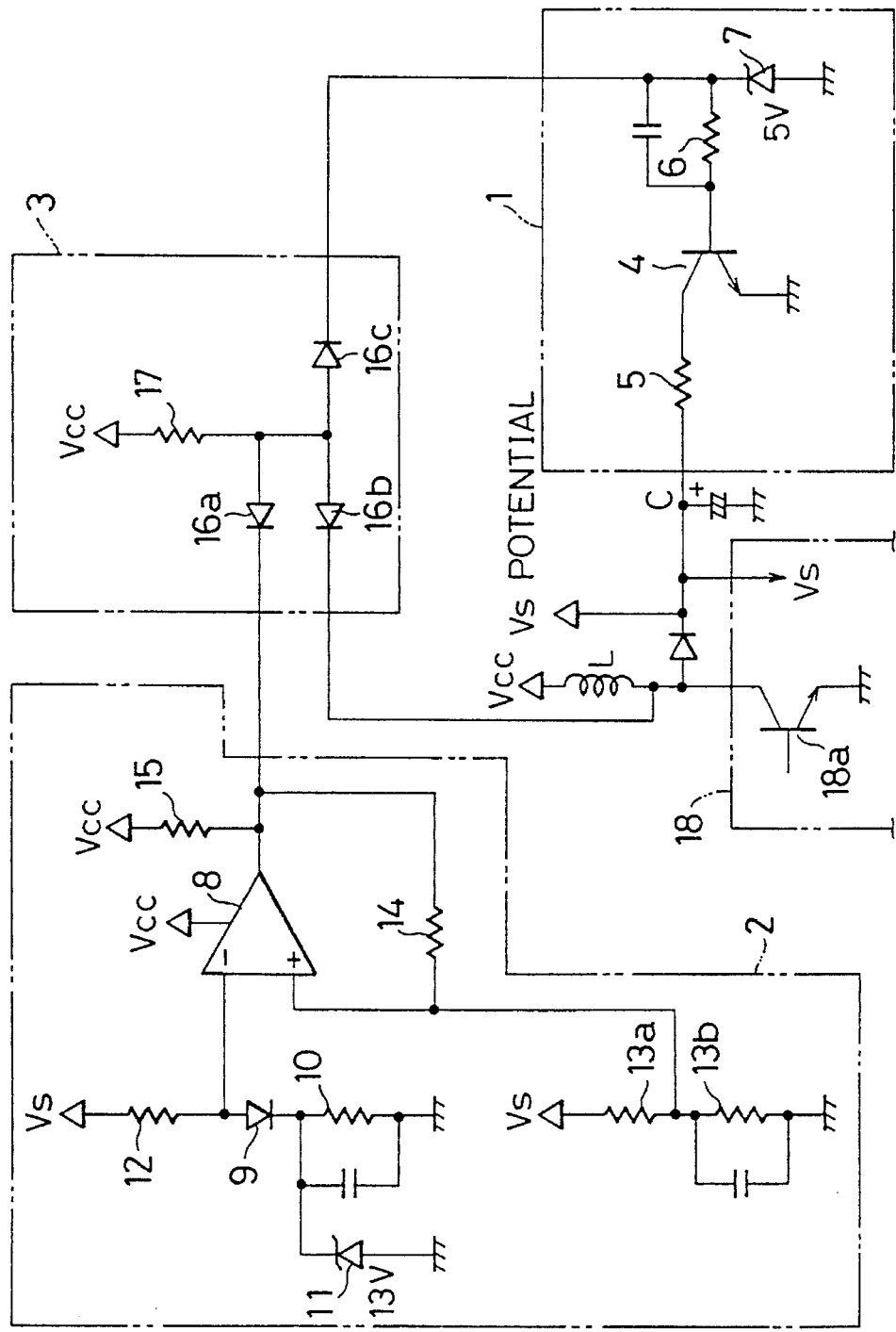
FIG. 1 is a circuit diagram of an embodiment of the overvoltage protection device of the present invention.

Hereinbelow, an embodiment of an overvoltage protection device of the present invention will be described in detail with reference to the accompanying drawings. Incidentally, components and their arrangements in the device described hereinbelow do not limit the scope of the present invention, and, therefore may be modified while remaining within the spirit of the present invention.

The device of the embodiment of the present invention comprises a discharging circuit 1 which functions as a discharging means, a charging voltage monitoring circuit 2 which functions as a judgment means and a control circuit 3 which functions a operation control means.

By the use of the overvoltage protection device of the embodiment of the present invention, a charging capacitor C, which is externally connected to a power IC 18 to receive its output voltage, is protected from a so-called "overvoltage". Particularly, as described later, the charging capacitor C is protected from the overvoltage when subjected to a voltage which is larger than a predetermined voltage used as a power supply voltage for the power IC 18.

The power IC 18 is of a chopper-type DC voltage transferring operation, to which a desired voltage (Vcc+alpha) is supplied from a power supply with a power supply voltage Vcc through on-off operations of an output transistor 18a.

A discharging circuit 1 is so constructed as to permit the charging capacitor C to discharge when opposite terminals of the capacitor C are short-circuited through a transistor 4 is arranged therebetween.

The transistor 4 has its collector connected with the charging capacitor C through a resistor 5, and its emitter connected to ground. On the other hand, the base of the transistor 4 is connected with a cathode side of a third diode 16c of the control circuit 3 (described later) through a resistor 6, and is also connected through the resistor 6 to a cathode side of a Zener diode 7 which has its anode connected to ground.

In this discharging circuit 1, when the third diode 16c of the control circuit 3 becomes conductive, a Zener voltage obtained from the Zener diode 7 is applied to the base of the transistor 4 to make the transistor 4 conductive, so that the charging capacitor C is permitted to discharge through the resistor 5 and the transistor 4.

A charging voltage monitoring circuit 2 is used to judge whether or not the charging voltage of the charging capacitor C has reached a predetermined value, which will be described later in more detail. In the embodiment of the present invention, the monitoring circuit 2 is constructed of a comparator circuit comprising a comparator 8.

The comparator 8 has its inverting input terminal connected to an anode of a diode 9, and, therefore has its inverting input terminal connected to ground through the diode 9 and a resistor 10. On the other hand, the diode 9 has its cathode connected with a cathode of a Zener diode 11 which has its anode connected to ground. The inverting input terminal of the comparator 8 is connected with the charging capacitor C through a resistor 12. Consequently, applied to this inverting input terminal of the comparator 8 is a Zener voltage obtained from the Zener diode 11 which uses the charging voltage Vs of the charging capacitor C as its power supply voltage.

On the other hand, the comparator 8 has its non-inverting input terminal connected with a junction between a pair of resistors 13a and 13b, which are connected in series between the charging capacitor C and ground so that the charging voltage Vs of the charging capacitor C is divided by the resistors 13a, 13b to produce a resistively divided voltage which is applied as a reference voltage. Connected between the output terminal of the comparator 8 and the non-inverting input terminal of the same is a feedback resistor 14 which provides hysteresis to the comparator 8.

The comparator 8 has its output terminal connected with a first diode 16a of the control circuit 3. Incidentally, the comparator 8 used in the embodiment of the present invention is of an open collector (i.e., o/c) type, and, therefore receives the power supply voltage Vcc through a resistor 15.

In a charging voltage monitoring circuit 2, the charging voltage Vs is not directly compared with the first reference voltage Vth1 and the second reference voltage Vth2. Compared in the comparator 8 is the resistively divided voltage which is obtained by resistively dividing the charging voltage Vs, whereby it is judged whether the charging voltage Vs reaches the first reference voltage Vth1 or the second reference voltage Vth2.

When it is judged in the charging voltage monitoring circuit 2 that the charging voltage Vs reaches the first reference voltage Vth1, the control circuit 3 permits the discharging circuit 1 to operate. On the other hand, when it is judged in the charging voltage monitoring circuit 2 that the charging voltage Vs reaches the second reference voltage Vth2, the control circuit 3 stops the operation of discharging circuit 1.

In the control circuit 3 of the embodiment of the present invention, the first diode 16a has its cathode connected to the output terminal of the comparator 8 of the charging voltage monitoring circuit 2 and has its anode receive the power supply voltage Vcc through a resistor 17. The anode of the first diode 16a is also connected with both the anode of the second diode 16b and the anode of the third diode 16c.

On the other hand, applied to both the cathode of the second diode 16b and the collector of the output transistor 18a of the power IC 18 through a coil L is the power supply voltage Vcc.

The cathode of the third diode 16c is connected with the transistor 4 of the discharging circuit 1 through the resistor 6.

Now, the operation of the device of the present invention having the above construction will be described with reference to FIGS. 2 to 4(b).

Figure 2:
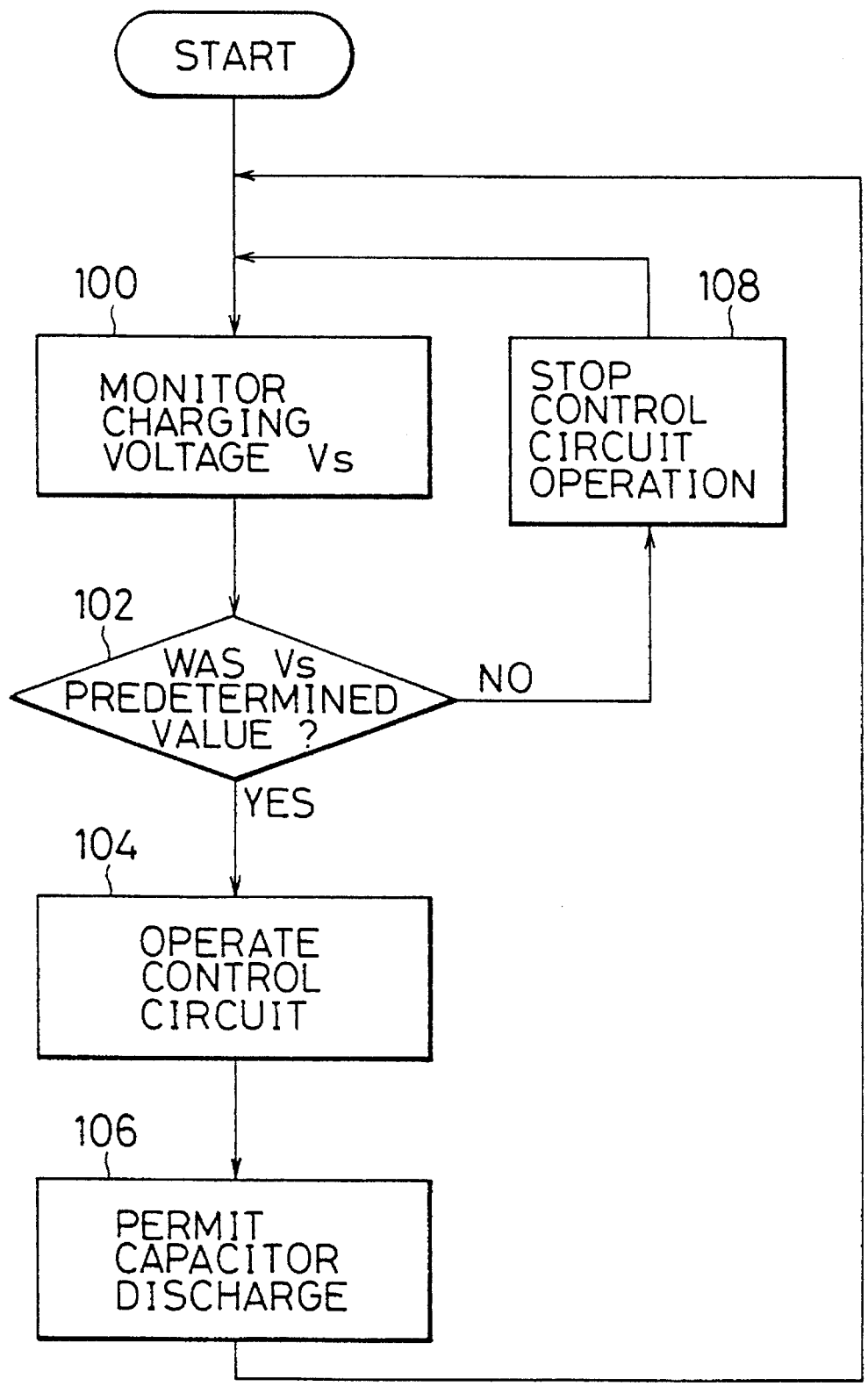
FIG. 2 is an operation flowchart representing a schematic operation of the device of the present invention.

A schematic operation of the device of the present invention is described with reference to an operation flowchart shown in FIG. 2. When the device of the present invention starts its operation, the charging voltage monitoring circuit 2 begins to monitor the charging voltage Vs of the charging capacitor C in a step 100 of the operation flowchart. In a step 102 following the step 100, it is judged whether or not the charging voltage Vs reaches a predetermined value. In the embodiment of the present invention, there are provided a pair of predetermined values: the first reference voltage Vth1; and, the second reference voltage Vth2. The first reference voltage Vth1 defines an upper limit value of the charging voltage Vs of the charging capacitor C after completion of its charging operation. On the other hand, the second reference voltage Vth2 defines lower limit value of the charging voltage Vs of the charging capacitor C after completion of its discharging operation.

Consequently, in the step 102 of the operation flowchart, when the charging voltage Vs is judged to reach the first reference voltage Vth1, the process goes to a step 104 following the step 102 as indicated by the arrow "YES" In the step 104, the control circuit 3 sets the discharging circuit 1 into operation, so that the charging capacitor C discharges in a step 106 following the step 104. The charging voltage Vs of the charging capacitor C is continuously monitored through the charging voltage monitoring circuit 2 in the step 100 of the flowchart. When it is judged in the step 100 that the charging voltage Vs reaches the second reference voltage Vth2 after completion of the discharging operation of the capacitor C, the process shown in the flowchart of FIG. 2 goes to a step 108 as indicated by the arrow "NO" In the step 108, the control circuit 3 stops the operation of the discharging circuit 1. As a result, the charging capacitor C begins to charge again. After that, the charging and discharging operation of the capacitor C is repeatedly conducted in the same manner as that described above.

The operation of the device of the present invention will be now described in more detail with reference to FIGS. 3(a) to 4(b).

A starting switch (not shown) is turned on so as to have the power supply voltage Vcc applied to both the device of the present invention and the power IC 18. Under such circumstances, in the charging voltage monitoring circuit 2, an input voltage in the non-inverting input terminal of the comparator 8 becomes slightly larger than that in the inverting input terminal of the comparator 8, as shown in FIGS. 3(a), 3(b) and 3(c). As a result, a logical output of the comparator 8 becomes a "High" level, for example, as shown in FIG. 3(d) at a time of t1. The input voltage in the non-inverting input terminal of the comparator 8 becomes slightly larger than that in the inverting input terminal of the comparator 8 when the starting switch (not shown) turned on is because the charging voltage Vs of the charging capacitor C does still not reach a level sufficient to operate the Zener diode 11.

After the power supply voltage Vcc is applied, the input voltage of the inverting input terminal of the comparator 8 exceeds that of the non-inverting input terminal of the comparator 8 as the charging voltage Vs of the charging capacitor C gradually increases toward the power supply voltage Vcc, so that the logical output of the comparator 8 becomes a "Low" level, for example, as shown in FIG. 3(d) at a time of t2. Incidentally, under such circumstances, the Zener diode 11 does still not produce its Zener voltage.

As shown in FIG. 3(e), the charging voltage Vs increasing toward the power supply voltage Vcc reaches the voltage Vcc, and further increases up to a voltage of Vcc+A volts, provided that the A is 10 volts in the embodiment of the present invention.

As a result of the increase of the charging voltage Vs, the Zener diode 11 starts its operation to keep the input voltage of the inverting input terminal of the comparator 8 at a voltage substantially equal to the Zener voltage, so that the input voltage of the non-inverting input terminal of the comparator 8 exceeds the input voltage of the inverting input terminal of the comparator 8, whereby the logical output of the comparator 8 becomes the "High" level, for example, as shown in FIG. 3(d) at a time of t3. At this time, the charging voltage Vs of the charging capacitor C substantially reaches its upper limit value (i.e., the voltage of Vcc+10 volts).

When the logical output of the comparator 8 becomes the "High" level, the first diode 16a of the control circuit 3 becomes non-conductive, while the power supply voltage Vcc is applied to the anodes of both the second diode 16b and the third diode 16c. When the output transistor 18a of the power IC 18 is in its non-conductive condition, the voltage is applied to the Zener diode 7 of the discharging circuit 1 through the third diode 16c so that the transistor 4 of the discharging circuit 1 becomes conductive, whereby the charging capacitor C begins to discharge through the resistor 5 and the transistor 4.

Figure 4A:
FIG. 4(a) is a schematic view of a waveform representing variations in the charging voltage of the charging capacitor.

The discharging operation of the charging capacitor C naturally decreases the terminal voltage Vs of the capacitor C. As for the comparator 8, when the thus decreasing terminal voltage Vs permits the input voltage of the non-inverting input terminal of the comparator 8 to be lower than the input voltage of the inverting input terminal of the comparator 8, the logical output of the comparator 8 becomes the "Low" level, for example, as shown in FIG. 3(d) at a time of t4. As a result, the first diode 16a of the control circuit 3 becomes conductive. At the same time, the anode potential of both the second diode 16b and the third diode 16c of the control circuit 3 becomes substantially zero so that the discharging circuit 1 stops its operation, which permits the charging capacitor C to start its charging operation again. After that, the charging and discharging operation of the capacitor C is repeatedly conducted in the same manner as above. Consequently, as shown in FIG. 4(a), the charging voltage Vs of the charging capacitor C alternately increases and decreases between the first reference voltage Vth1 and the second reference voltage Vth2.

Figure 4B:
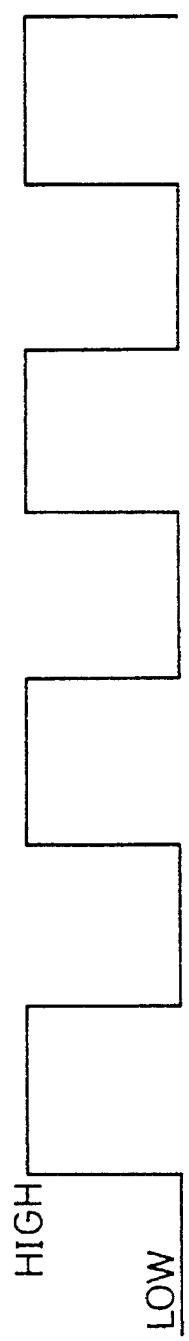
FIG. 4(b) is a schematic view of a waveform representing variations in the output of the comparator in the charging voltage monitoring circuit.
Figure 5:
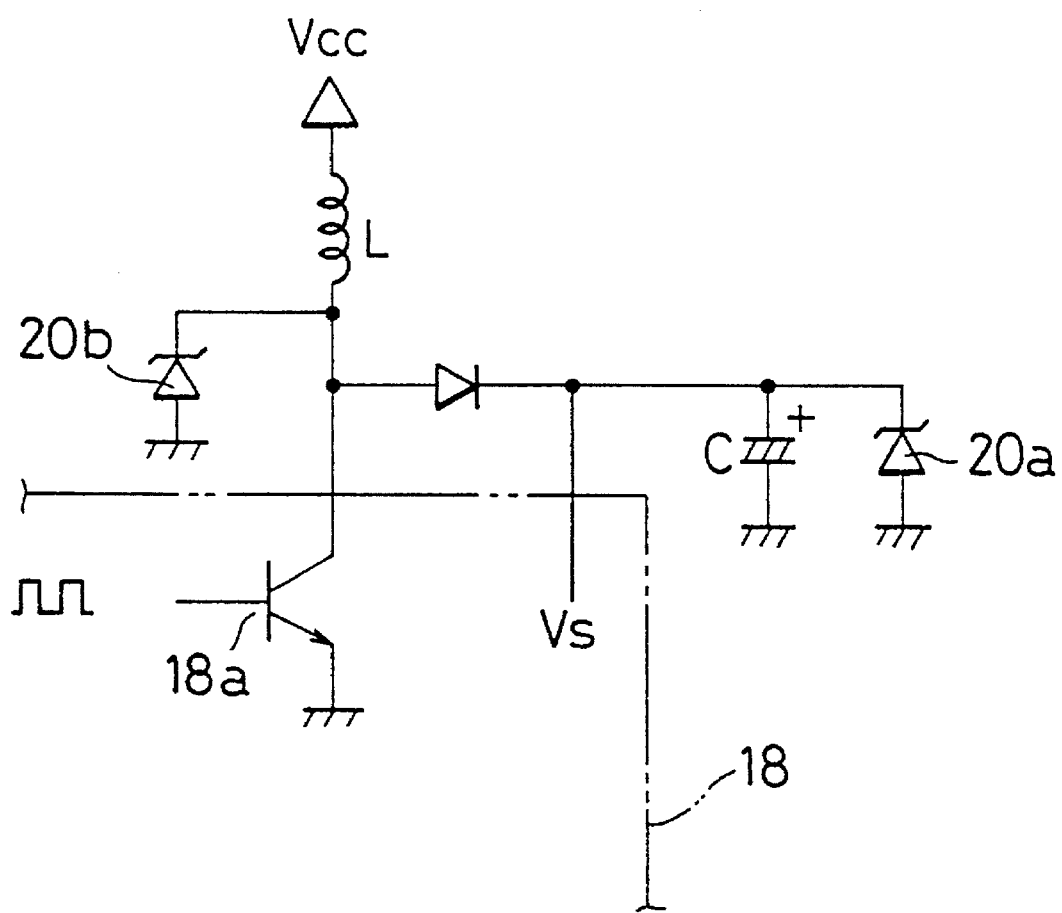
FIG. 5 is a schematic diagram illustrating the outline of the power IC used in the device of the present invention.

In this case, as for the logical output of the comparator 8, as shown in FIG. 4 (b), when the voltage Vs of the charging capacitor C reaches the first reference voltage Vth1, the logical output becomes the "High" level. On the other hand, when the voltage Vs reaches the second reference voltage Vth2, the logical output becomes the "Low" level. As is clear from FIG. 4(b), the "High" level and the "Low" level of the logical output of the comparator 8 repeatedly alternate with each other.

Consequently, for example, in the case where the maximum dielectric strength of the power IC 18 adapted to be used as a power supply for actuating a brushless motor of a 12-volt system is 36 volts, and where the power IC 18 is used as a power supply for actuating a brushless motor of a 24-volt system, it is possible for the overvoltage protection device of the embodiment of the present invention to prevent the charging voltage Vs of the charging capacitor C from exceeding the upper limit value of 34 volts even when the power IC 18 is subjected to a voltage of 24 volts. Consequently, the overvoltage protection device of the present invention permits the power IC 18 to be used as the power supply for actuating the brushless motor of the 24-volt system. In other words, it is possible to use the power IC 18 of the 12-volt system in the 24-volt system in a safe manner without changing the specifications of the power IC 18 of the 12-volt system, provided that the power IC 18 of the 12-volt system is used under its maximum dielectric strength.

Incidentally, in the embodiment of the present invention, although the cathode of the second diode 16b of the control circuit 3 is connected with the collector of the output transistor 18a of the power IC 18, this connection or construction is not essential, and, therefore is negligible in the context of the present invention.

Further, in the embodiment of the present invention, although the device of the present invention is constructed of a plurality of discrete parts, such construction is also not essential in the present invention. For example, it is also possible in the device of the present invention to replace the operation of the charging voltage monitoring circuit 2 with a microcomputer program. In this case, the operation flowchart shown in FIG. 2 represents a microcomputer program in which the charging voltage of the charging capacitor C is converted through an A/D converter into a digital data which is stored in a microcomputer and judged through comparison with each of the reference voltages Vth1, Vth2. On the basis of the thus obtained judgment, the control circuit 3 is operated.

As described above, in the present invention, in order to prevent the voltage of the charging capacitor charged through the power IC from exceeding the dielectric strength of the power IC, the charging and discharging operation of the charging capacitor is repeatedly conducted so that the charging voltage of the capacitor through the power IC alternately increases and decreases within a predetermined range, whereby an electric breakdown of the power IC caused by overvoltage in the charging voltage is prevented which improves the overall system reliability.

What is claimed is:

1. An overvoltage protection device for a capacitor externally connected to a power IC, comprising:

a discharge circuit which is enabled to discharge the capacitor when a control signal is applied thereto and which is disabled in the absence of a control signal applied thereto;

a hysteresis comparator for comparing a voltage across the capacitor with first and second reference voltages, the first reference voltage being greater than the second reference voltage, an output of said hysteresis comparator changing from a first state to a different second state each time the capacitor voltage increases to the first reference voltage from the second reference voltage and changing from the second state to the first state each time the capacitor voltage decreases to the second reference voltage from the first reference voltage; and a control circuit, operatively coupled to said discharge circuit and to said hysteresis comparator, for outputting the control signal to said discharge circuit when the output of said hysteresis comparator is the second state and for not outputting the control signal to said discharge circuit when the output of said hysteresis comparator is the first state.

2. An overvoltage protection device for a capacitor externally connected to a power IC, comprising:

a discharge circuit which is enabled to discharge the capacitor when a control signal is applied thereto and which is disabled in the absence of a control signal applied thereto, wherein said discharge circuit comprises a transistor for connecting in parallel with the capacitor through a first resistor, said transistor becoming conductive when the control signal is applied thereto;

a hysteresis comparator for comparing a voltage across the capacitor with first and second reference voltages, the first reference voltage being greater than the second reference voltage, an output of said hysteresis comparator changing from a first state to a different second state each time the capacitor voltage increases to the first reference voltage from the second reference voltage and changing from the second state to the first state each time the capacitor voltage decreases to the second reference voltage from the first reference voltage, wherein said hysteresis comparator comprises an operational amplifier and a voltage divider circuit coupled to an input of said operational amplifier, said voltage divider circuit including a Zener diode and resistively dividing the capacitor voltage to produce a resistively divided voltage and comparing the resistively divided voltage with a Zener voltage obtained from said Zener diode, wherein the capacitor voltage is a power supply voltage of said Zener diode, and wherein the Zener voltage is larger than the resistively divided voltage when the capacitor voltage reaches said first reference voltage; and a control circuit, operatively coupled to said discharge circuit and to said hysteresis comparator, for outputting the control signal to said discharge circuit when the output of said hysteresis comparator is the second state and for not outputting the control signal to said discharge circuit when the output of said hysteresis comparator is the first state, wherein said control circuit comprises a first diode and a second diode, wherein said first diode has one of its opposite terminals connected with a power supply through a second resistor and the other of its opposite terminals connected with an output terminal of said hysteresis comparator, and wherein said second diode has one of its opposite terminals connected with a junction between said first diode and said second resistor, and the other of its opposite terminals connected with an input terminal of said discharge circuit.

3. A power supply device comprising:

a power IC having a power supply voltage input terminal and a boosted voltage output terminal;

a charging capacitor connected between said boosted voltage output terminal of said power IC and ground;

a discharge circuit which is enabled to discharge said charging capacitor when a control signal is applied thereto and which is disabled in the absence of a control signal applied thereto;

a hysteresis comparator for comparing a voltage across said discharge capacitor with first and second reference voltages, the first reference voltage being greater than the second reference voltage, an output of said hysteresis comparator changing from a first state to a different second state each time said charging capacitor voltage increases to the first reference voltage from the second reference voltage and changing from the second state to the first state each time said charging capacitor voltage decreases to the second reference voltage from the first reference voltage; and a control circuit, operatively coupled to said discharge circuit and to said hysteresis comparator, for outputting the control signal to said discharge circuit when the output of said hysteresis comparator is the second state and for not outputting the control signal to said discharge circuit when the output of said hysteresis comparator is the first state.

4. A power supply device comprising:

a power IC having a power supply voltage input terminal and a boosted voltage output terminal;

a charging capacitor connected between said boosted voltage output terminal of said power IC and ground;

a discharge circuit which is enabled to discharge the capacitor when a control signal is applied thereto and which is disabled in the absence of a control signal applied thereto, wherein said discharge circuit comprises a transistor for connecting in parallel with the capacitor through a first resistor, said transistor becoming conductive when the control signal is applied thereto;

a hysteresis comparator for comparing a voltage across the capacitor with first and second reference voltages, the first reference voltage being greater than the second reference voltage, an output of said hysteresis comparator changing from a first state to a different second state each time said charging capacitor voltage increases to the first reference voltage from the second reference voltage and changing from the second state to the first state each time said charging capacitor voltage decreases to the second reference voltage from the first reference voltage, wherein said hysteresis comparator comprises an operational amplifier and a voltage divider circuit coupled to an input of said operational amplifier, said voltage divider circuit including a Zener diode and resistively dividing the capacitor voltage to produce a resistively divided voltage and comparing the resistively divided voltage with a Zener voltage obtained from said Zener diode, wherein the capacitor voltage is a power supply voltage of said Zener diode, and wherein the Zener voltage is larger than the resistively divided voltage when the capacitor voltage reaches said first reference voltage; and a control circuit, operatively coupled to said discharge circuit and to said hysteresis comparator, for outputting the control signal to said discharge circuit when the output of said hysteresis comparator is the second state and for not outputting the control signal to said discharge circuit when the output of said hysteresis comparator is the first state, wherein said control circuit comprises a first diode and a second diode, wherein said first diode has one of its opposite terminals connected with a power supply through a second resistor and the other of its opposite terminals connected with an output terminal of said hysteresis comparator, and wherein said second diode has one of its opposite terminals connected with a junction between said first diode and said second resistor, and the other of its opposite terminals connected with an input terminal of said discharge circuit.

* * * * *

UNITED STATES PATENT AND TRADEMARK OFFICE
CERTIFICATE OF CORRECTION

PATENT NO.  :   5,555,148
DATED       :   September 10, 1996
INVENTOR(S) :   Hideaki MATSUZAKI et al.

It is certified that error appears in the above-indentified patent and that said Letters Patent is hereby corrected as shown below:

In column 8, line 30, "larger" has been changed to --smaller--.

In column 10, line 11, "larger" has been changed to --smaller--.

Signed and Sealed this

Twenty-third Day of September, 1997

Attest:

BRUCE LEHMAN

*Attesting Officer*      *Commissioner of Patents and Trademarks*